United States Patent [19]
Kuhn et al.

[11] 3,892,210
[45] July 1, 1975

[54] COOLED EXHAUST VALVE FOR AN INTERNAL COMBUSTION ENGINE

[75] Inventors: Karl Kuhn, Saint-Germain-en-Laye; Jean-Claude Bouquet, Pantin, both of France

[73] Assignee: Societe d'Etudes de Machines Thermiques, Saint-Denis, France

[22] Filed: Feb. 14, 1974

[21] Appl. No.: 442,648

[30] Foreign Application Priority Data
Mar. 13, 1973  France .............................. 73.08917

[52] U.S. Cl. ........ 123/90.3; 123/41.41; 123/188 GC
[51] Int. Cl. .............................................. F01l 1/32
[58] Field of Search ............ 123/90.3, 41.41, 188 A, 123/188 AF, 188 GC

[56] References Cited
UNITED STATES PATENTS
| | | | |
|---|---|---|---|
| 975,255 | 11/1910 | Koven .......................... | 123/188 GC |
| 2,397,502 | 4/1946 | Ralston ............................. | 123/90.3 |
| 2,582,060 | 1/1952 | Newton............................. | 123/90.3 |
| 2,624,323 | 1/1953 | Thorne ............................. | 123/90.3 |
| 2,662,511 | 12/1953 | Sward ............................... | 123/90.3 |
| 2,935,058 | 5/1960 | Dooley............................. | 123/90.3 |
| 3,313,277 | 4/1967 | Adolfsson ...................... | 123/41.41 |

*Primary Examiner*—Manuel A. Antonakas
*Assistant Examiner*—Daniel J. O'Connor
*Attorney, Agent, or Firm*—Kenyon & Kenyon Reilly Carr & Chapin

[57] ABSTRACT

An internal combustion engine valve, of the type cooled by circulating a fluid in channels provided in the valve stem and head, and comprising in combination, means known per se, for rotating the valve during its opening and/or closing motions, and a rotary joint connecting the channels of the valve stem to cooling fluid supply and return conduits.

5 Claims, 1 Drawing Figure

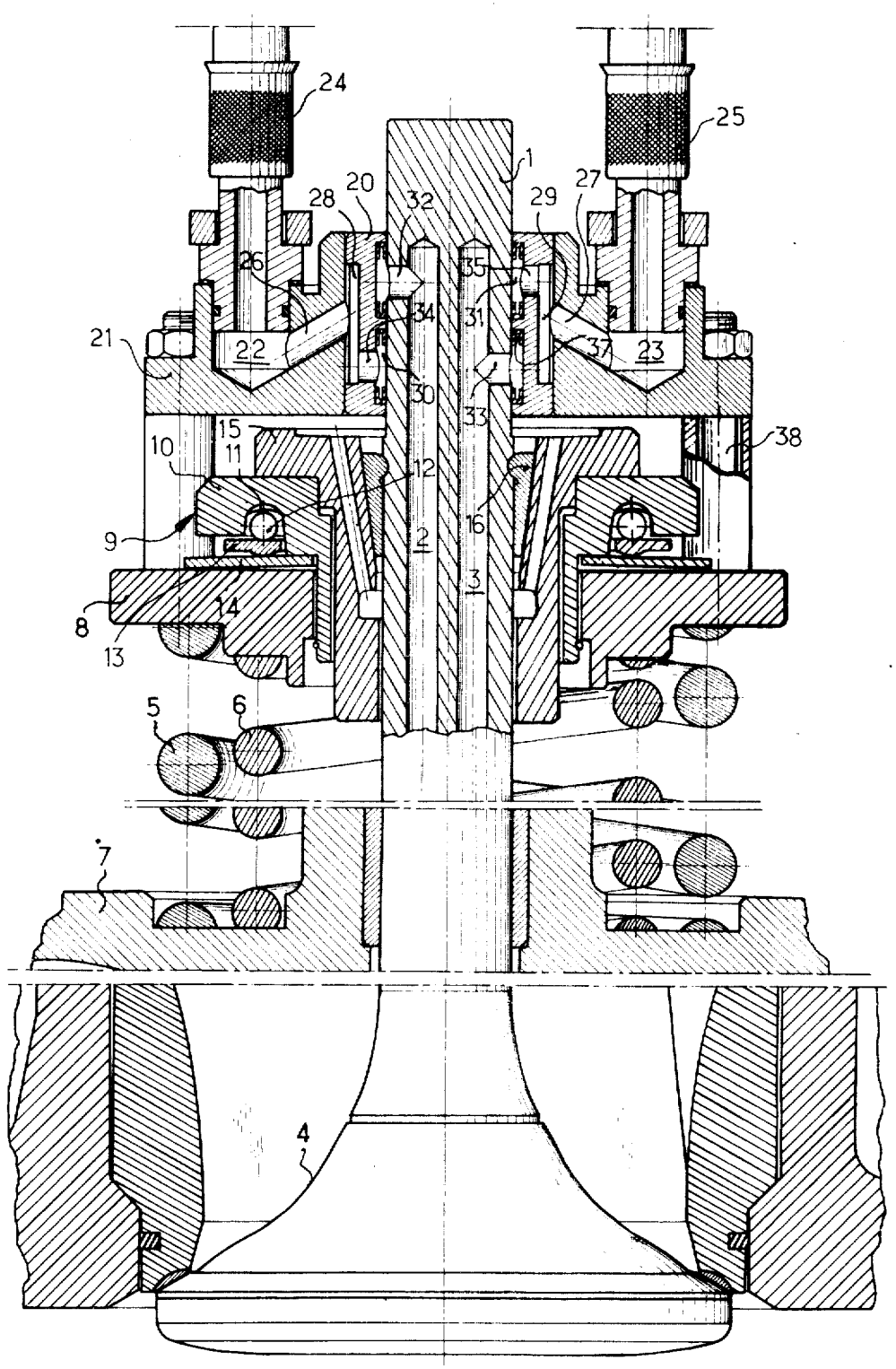

COOLED EXHAUST VALVE FOR AN INTERNAL COMBUSTION ENGINE

The present invention relates essentially to a valve, more particularly of the mushroom type cooled by circulation of a fluid in channels provided in the stem and head of the said valve.

Indeed, more and more stringent requirements are imposed as regards the valves of internal combustion engines, in particular the exhaust valves, and it has been attempted to increase the working life of such valves. This has been attained in various manners, e.g. either by cooling the valves by forced circulation of a cooling fluid through channels and/or chambers provided in the valve stem and head, or by using devices imperatively causing the valves to turn in order to avoid deposits of combustion products on the valves, non-uniform heating of the valve head, the sealing defects resulting from the scaling produced by the combustion residues (and leading to burns on the sealing surface).

The purpose of the invention is to further improve the resistance and working life of the valve by combining the two above-mentioned methods, i.e. cooling the valve head and stem by circulation of a cooling fluid and imperatively causing the valve to rotate about its longitudinal axis during its opening and/or closing.

The invention therefore provides a cooled valve of the aforementioned type, which is characterized in that it comprises, in combination, means known per se for rotating the valve during its opening and/or closing and a rotary joint connecting the valve stem to, respectively, the cooling fluid supply and return conduits.

According to another feature of the invention, the said rotary joint is essentially formed of a tubular cylindrical member retained against rotation and mounted around the said valve stem, the said cylindrical member being provided on its internal surface with superposed separate annular grooves provided with seals in sliding contact with the cylindrical surface of the said stem and connecting the said cooling fluid supply and return conduits to the said channels of the valve stem.

Thus, the invention allows the combination of a temporary coupling of a known type enabling the valve to be driven in a single direction of rotation with a rotary joint device enabling the valve to be supplied with cooling fluid during its travel and during its rotary motion about its longitudinal axis.

The invention will be better understood and other purposes, features, details and advantages of the latter will appear more clearly from the following explanatory description made with reference to the appended diagrammatic drawing given solely by way of example illustrating one form of embodiment of the invention and wherein the single FIGURE shows a partial longitudinal sectional view of an exhaust valve provided with the device according to the invention.

The exhaust valve is shown in partial longitudinal section in the drawing and its stem 1 is provided with at least two longitudinal channels 2 and 3 formed within the valve stem and arranged separately in parallel relationship to the longitudinal axis of the said valve. The channels 2 and 3 communicate with one another, for example through the medium of a chamber (not shown) arranged in the valve head 4, the channel 3 serving for example for the supply of cooling fluid into the valve head and the channel 2 serving for the return of the cooling fluid.

Valve springs 5 and 6 are arranged on the one hand between a lower stationary portion 7 and an upper annular plate 8 surrounding the valve stem. On this plate is mounted a rotator device 9 of a type known per se, such as a temporary coupling forming an automatic, unidirectional instantaneous drive clutch, so as to allow the rotation of the valve about its longitudinal axis in a single direction of rotation during its opening and/or closing. This device is already well known and will be described only in order to facilitate the understanding of the operation of the device according to the invention.

The device 9 comprises an annular plate 10 provided on its periphery opposite the plate 8 with a series of recesses 11 in which are located balls 12. The bottom of the said recesses forms an inclined guide on which the ball 12 can roll, and a spring (not shown) displaced in each recess 11 between the ball 12 and an end of the recess 11. A set of spring washers and annular plates 13, 14 covers the recess 11 and the balls 12. The plate 10 is so mounted as to rotate jointly with a cylindrical member 15 which itself is so mounted as to move in rotation and translation jointly with the valve stem 1 by means of two conical half-shells or half-couplings. In the normal operating position, the device 9 is located between the cylindrical member 15 and the plate 8 forming a support or retainer for the valve springs 5 and 6.

About the upper end of the valve stem 1 is arranged a cylindrical member 20 forming a communication between the channels 2 and 3 of the valve stem and cooling fluid supply and return means.

The said cooling fluid supply and return means comprise an annular member 21 mounted around the cylindrical member 20 and movable in translation and rotation jointly with the latter. The member 21 is provided with channels 22 and 23 into which open respectively the cooling fluid supply and return conduits 24 and 25. Each conduit 22, 23 communicates through a conduit, respectively 26, 27, with a longitudinal slot, respectively 28, 29, provided on the external surface of the cylindrical member 20.

On the radially internal surface of the member 20 are provided two annular grooves 30, 31 separated from and placed above one another. The channels 2 and 3 of the valve stem open outside the said stem through orifices, respectively 32 and 33, which are shifted in height along the valve stem so as to be located each opposite an annular groove 30, 31. Moreover, each of the slots 28, 29 communicates through a conduit 34, 35, respectively, with one of the internal annular grooves 30, 31.

Two annular seals 37 are arranged in each annular groove 30, 31 between the external wall of the valve stem and the groove bottom, so as to enable the valve to rotate within the member 20 without fluid leakage, and are for example of the type provided with lips ensuring a perfect sealing by the pressure of an incorporated spring and of the working fluid.

Therefore, the member 20 moves in rotation and translation jointly with the member 21 which itself moves in rotation and translation with the plate 8 by means of the bolts 38.

The operation of the device is as follows.

The cooling fluid is supplied through the conduit 24, passes through the channels 22 and 26 and then through the slot 28. Therefrom the fluid passes through the conduit 34 into the annular groove 30 communicating with the channel 3 through the radial orifice 33. After circulating in the valve stem and head, the fluid flows out from the channel 2 through the radial orifice 32 and then flows into the annular groove 31 through the conduit 35 and passes through the channels 27 and 23 connected with the fluid return conduit 25.

The annular seals 37 enable the valve stem to rotate within the member 20 while at the same time permitting a constant passage of cooling fluid.

During the downward travel of the valve, the translation of the stem is transmitted by the half-shells, or half-couplings 16 and the member 15 to the temporary coupling device 9 which itself transmits this motion of translation to the plate 8, thus compressing the springs 5 and 6. During this downward travel of the valve where the springs are compressed, the plate and rings 13 and 14 exert a pressure upon the balls 12 of the device 9 and compel the balls to roll on the inclined guide formed by the bottom of the recesses 11, by compressing the said springs. At the same time, the plate 10 itself rolls on the balls and this rotary motion is transmitted to the valve stem. The rotary motion thus produced is theoretically equal to twice the rolling path of a ball.

On the contrary, during the upward travel of the valve, the effort applied by the set of rings and plates 13 and 14 on the balls 12 diminishes, so that the latter are pushed back by the associated spring, without rolling, towards their initial position, and no rolling of the plate 10 takes place. Thus, during each downward travel, the valve advances by a certain angle of rotation in a given direction and does not rotate during the upward travel.

Of course, the invention is by no means limited to the form of embodiment described and illustrated which has been given by way of example only. In particular, the described ball rotator device may be replaced by any type of temporary coupling forming an automatic, instantaneous drive clutch, or differential, permitting the rotation of the valve stem in a single direction of rotation. The invention therefore comprises all the means constituting technical equivalents to the means described as well as their combinations, should the latter be carried out according to its spirit and within the scope of the following claims.

What is claimed is:

1. An internal combustion engine valve having a valve stem and head of the type cooled by circulating a fluid in channels provided in the valve stem and head, comprising valve springs mounted about the valve stem, a valve rotating device including an annular plate mounted around the valve stem and receiving the load of the valve springs, a rotary joint mounted around the valve stem and having passage means therein connecting the channels of the valve stem to fluid supply and return conduits, said rotary joint being secured to said annular plate whereby said rotary joint and said annular plate are movable axially jointly with the valve and are substantially retained against rotation relative to the valve stem.

2. A valve according to claim 1, wherein the said rotary joint comprises a tubular cylindrical member mounted around the valve stem and retained against rotation, said cylindrical member having an internal cylindrical surface, two separate superposed annular grooves provided in said internal surface for connecting respectively the fluid supply and return conduits to the channels of the valve stem, and seals located in said annular grooves in sliding contact with the surface of said stem.

3. A valve according to claim 2, including lips for said seals to insure substantially perfect sealing by spring and fluid pressure.

4. A valve according to claim 2 including a coaxial external annular member and wherein said cylindrical member is mounted stationarily in said coaxial external annular member, said last-named member being secured to said annular plate of said valve rotating device, said external annular member carrying the ends of said fluid supply and return conduits and having channels communicating with the said annular grooves and the said fluid supply and return conduits.

5. A valve according to claim 1, wherein the valve rotating device is a temporary coupling forming an automatic unidirectional instantaneous drive clutch.

* * * * *